(12) United States Patent
Scheirer

(10) Patent No.: US 12,331,857 B2
(45) Date of Patent: Jun. 17, 2025

(54) APPARATUS WITH INTERLOCKING SURFACES TO SECURE ANGLE OF HYDRAULIC COUPLING CONNECTIONS

(71) Applicant: Caterpillar Inc., Peoria, IL (US)

(72) Inventor: Jacob Andrew Scheirer, Tomball, TX (US)

(73) Assignee: Caterpillar Inc., Peoria, IL (US)

( * ) Notice: Subject to any disclaimer, the term of this patent is extended or adjusted under 35 U.S.C. 154(b) by 495 days.

(21) Appl. No.: 17/819,644

(22) Filed: Aug. 15, 2022

(65) Prior Publication Data

US 2024/0052958 A1 Feb. 15, 2024

(51) Int. Cl.
| | |
|---|---|
| *F16L 23/032* | (2006.01) |
| *E02F 9/22* | (2006.01) |
| *F16L 47/14* | (2006.01) |
| *F16L 23/00* | (2006.01) |

(52) U.S. Cl.
CPC .......... *F16L 23/032* (2013.01); *E02F 9/2275* (2013.01); *F16L 47/14* (2013.01); *F16L 23/003* (2013.01)

(58) Field of Classification Search
CPC ..... E02F 9/2275; F16L 23/003; F16L 23/032; F16L 47/14
See application file for complete search history.

(56) References Cited

U.S. PATENT DOCUMENTS

| | | | | |
|---|---|---|---|---|
| 4,225,161 A | * | 9/1980 | Smith | F16L 23/006 |
| | | | | 285/137.11 |
| 5,348,349 A | | 9/1994 | Sloane | |
| 5,755,464 A | | 5/1998 | Erwin | |
| 6,293,595 B1 | | 9/2001 | Marc et al. | |
| 7,114,252 B2 | * | 10/2006 | Tanielian | H01L 23/49805 |
| | | | | 257/E23.188 |
| 7,469,934 B2 | * | 12/2008 | Inaba | F16L 39/00 |
| | | | | 285/137.11 |
| 9,228,682 B1 | * | 1/2016 | Rocheleau | F16L 23/032 |
| 9,611,960 B2 | * | 4/2017 | Swingley | F16L 23/006 |
| 9,982,819 B2 | | 5/2018 | Baxter et al. | |
| 10,729,996 B2 | | 5/2020 | Rodriguez et al. | |
| 12,173,820 B2 | * | 12/2024 | Dinis | F16L 23/003 |
| 2019/0316720 A1 | | 10/2019 | Hidley | |
| 2024/0026633 A1 | * | 1/2024 | Scheirer | E02F 9/2267 |

FOREIGN PATENT DOCUMENTS

EP 3176484 A1 6/2017

* cited by examiner

*Primary Examiner* — Michael Leslie

(57) ABSTRACT

In some implementations, a hydraulic coupling connection includes a coupling disposed at an end of a hose and defining a flange having: a lower surface configured to engage a body of a valve; an upper surface; and an outer diameter surface connecting the lower surface and the upper surface, the outer diameter surface defining a first plurality of straight sides; and a split flange engaged with the coupling, the split flange having: a first lower surface configured to engage the body of the valve; a second lower surface configured to engage the upper surface of the flange; and an inner diameter surface connecting the first lower surface and the second lower surface, the inner diameter surface defining a second plurality of straight sides, wherein engagement between the first plurality of straight sides and the second plurality of straight sides is configured to secure the connection at a first angle.

20 Claims, 4 Drawing Sheets

APPARATUS WITH INTERLOCKING SURFACES TO SECURE ANGLE OF HYDRAULIC COUPLING CONNECTIONS

TECHNICAL FIELD

The present disclosure relates generally to hydraulic coupling connections and, for example, to an apparatus with interlocking surfaces that secures hydraulic coupling connections at a certain angle.

BACKGROUND

Machines, such as track-type tractors, and systems, such as implement control systems, may use flowlines (e.g., a hydraulic hose) to route fluid (e.g., hydraulic fluid) between different parts and/or components. The hose may have a coupling connection at each end to secure the hose to the different components.

Generally, because the work area associated with coupling connections is a cramped area with little clearance, installers have to be careful that the hose does not contact other parts (e.g., other hoses or sheet metal) to avoid damage (e.g., breakage) caused by rubbing and/or vibration, which may result in fluid leakage and/or system downtime for making repairs. Generally, the connection can be set at any angle. The task of connecting the hose at a certain angle (e.g., to avoid contact with other parts) is thus inefficient, physically taxing, and time-consuming.

The apparatus of the present disclosure solves one or more of the problems set forth above and/or other problems in the art.

SUMMARY

In some implementations, an earthmoving machine includes: a frame; one or more implements mounted on the frame; an engine configured to power the machine; ground engaging members configured to propel the machine; and an implement control system configured to control the one or more implements, wherein the implement control system includes: a pump configured to supply fluid, at pressure, to the one or more implements; a valve configured to supply fluid, at pressure, from the pump, selectively to the one or more implements; a first hose connected between the pump and the valve, wherein a connection defined between the first hose and the valve includes: a coupling disposed at an end of the first hose and defining a flange having: a lower surface configured to engage a body of the valve; an upper surface; and an outer diameter surface connecting the lower surface and the upper surface, the outer diameter surface defining a first one or more straight sides; and a split flange engaged with the coupling, the split flange having: a first lower surface configured to engage the body of the valve; a second lower surface configured to engage the upper surface of the flange; and an inner diameter surface connecting the first lower surface and the second lower surface, the inner diameter surface defining a second one or more straight sides, wherein engagement between the first one or more straight sides and the second one or more straight sides is configured to secure the connection at a first angle; and a plurality of fasteners disposed through corresponding openings in the split flange, wherein the plurality of fasteners are configured to secure the split flange and the coupling to the body of the valve; and a second hose connected between the valve and a first implement of the one or more implements.

In some implementations, a hydraulic coupling connection defined between a hose and a valve of a machine, includes: a coupling disposed at an end of the hose and defining a flange having: a lower surface configured to engage a body of the valve; an upper surface; and an outer diameter surface connecting the lower surface and the upper surface, the outer diameter surface defining a first plurality of straight sides; and a split flange engaged with the coupling, the split flange having: a first lower surface configured to engage the body of the valve; a second lower surface configured to engage the upper surface of the flange; and an inner diameter surface connecting the first lower surface and the second lower surface, the inner diameter surface defining a second plurality of straight sides, wherein engagement between the first plurality of straight sides and the second plurality of straight sides is configured to secure the connection at a first angle.

In some implementations, an apparatus, for a hydraulic coupling connection defined between a hose and a valve of a machine, the hydraulic coupling connection including a split flange configured to be engaged with a coupling disposed at an end of the hose, includes: an outer diameter surface, of the coupling, defining a first plurality of straight sides; and an inner diameter surface, of the split flange, defining a second plurality of straight sides corresponding to the first plurality of straight sides, wherein engagement between the first plurality of straight sides and the second plurality of straight sides is configured to secure the connection at a plurality of incremental angles.

DETAILED DESCRIPTION

This disclosure relates to an apparatus with interlocking surfaces, which is applicable to any machine or system that includes coupling connections (e.g., hydraulic coupling connections). The term "machine" may refer to any machine that performs an operation associated with an industry such as, for example, mining, construction, farming, transportation, or another industry. For example, the machine may be an earthmoving machine (e.g., a track-type tractor, motor grader, or wheel loader) and/or other machines. One or more implements may be connected to the machine. Example systems may include an implement control system associated with the one or more implements of the machine, an engine, a genset, and/or other systems.

Figure 1:
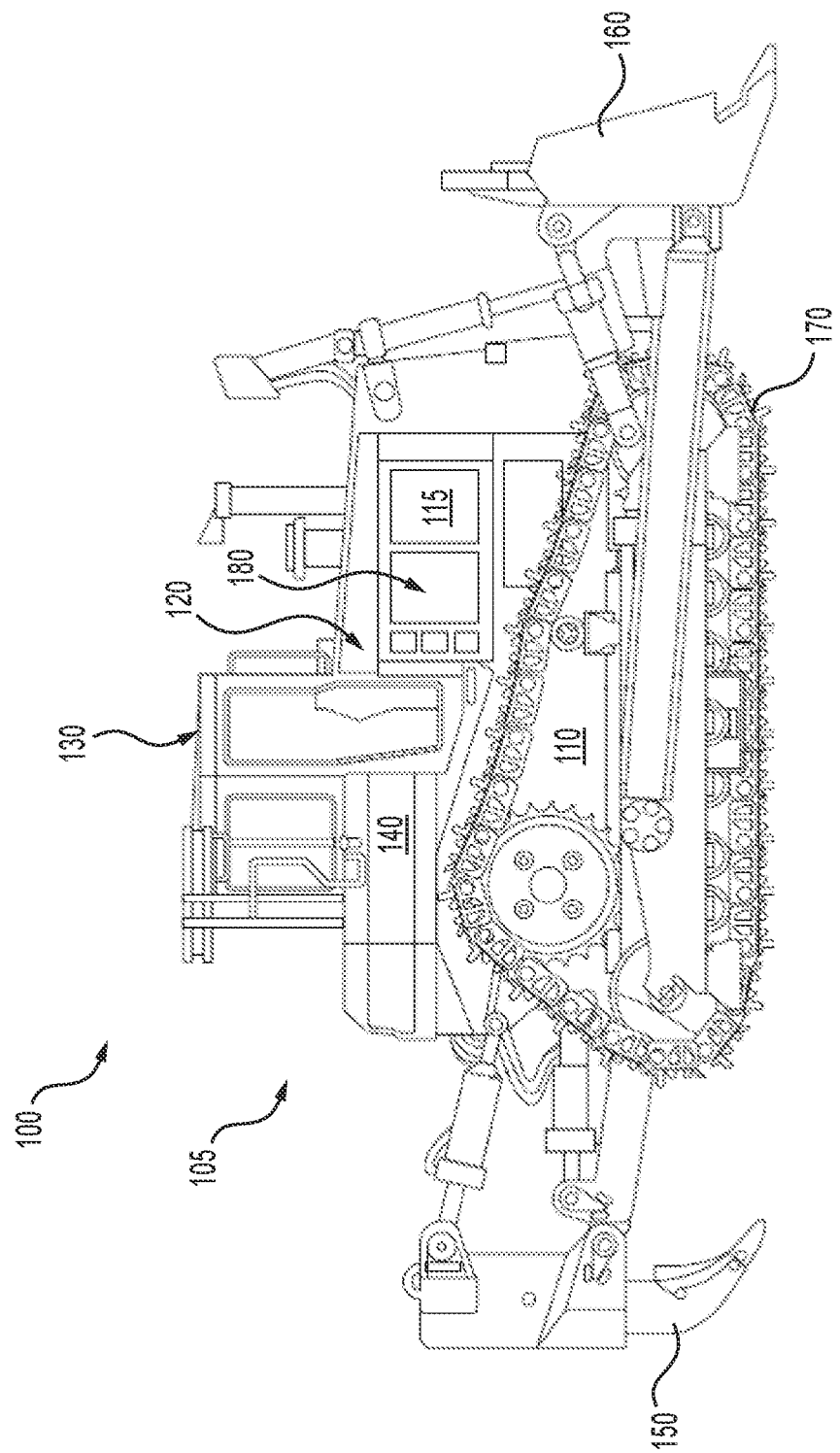
FIG. 1 is a diagram of an example implementation described herein.

FIG. 1 is a diagram of an example implementation 100 described herein. For example, FIG. 1 depicts a side view of an earthmoving machine 105, namely a track-type tractor (or dozer). Alternatively, the machine 105 may be another type of track-type machine, such as an excavator, among other examples. As shown in FIG. 1, the example implementation 100 includes at least the machine 105 and an implement control system 180 associated with the machine 105.

As shown in FIG. 1, the machine 105 includes a frame 110. The machine may include, mounted on the frame 110, an engine 115, a sensor system 120, an operator cabin 130, a controller 140, a rear attachment 150 and/or a front attachment 160 (which also may be referred to as "implements"), ground engaging members 170, and the implement control system 180.

The engine 115 may include an internal combustion engine, such as a compression ignition engine, a spark ignition engine, a laser ignition engine, or a plasma ignition engine, among other examples. The engine 115 provides power to the machine 105 and/or a set of loads (e.g., components that use power to operate) associated with the machine 105. For example, the engine 115 may provide power to the sensor system 120, the operator cabin 130, one or more control systems (e.g., the controller 140), the ground engaging members 170, and/or the implement control system 180.

The engine 115 can provide power to an implement of the machine 105 (e.g., the rear attachment 150 and/or the front attachment 160), such as an implement used in mining, construction, farming, transportation, or any other industry. For example, the engine 115 may power components (e.g., one or more hydraulic pumps, one or more actuators, and/or one or more electric motors) to facilitate control of the rear attachment 150 and/or the front attachment 160 of the machine 105.

The sensor system 120 may include sensor devices that are capable of generating information regarding an amount of wear of one or more components of the machine 105, an operation of the machine 105, a pose of the machine 105, and/or an environment of the machine 105, among other examples.

The operator cabin 130 may include an integrated display and operator controls. The operator controls may include one or more input components (e.g., integrated joysticks, push-buttons, control levers, and/or steering wheels) to control an operation of the machine 105. For an autonomous machine, the operator controls may not be designed for use by an operator and, rather, may be designed to operate independently from an operator. For example, the operator controls may include one or more input components that provide input instructions for use by another component without any operator input.

The controller 140 (e.g., an electronic control module) may control and/or monitor operations of the machine 105. For example, the controller 140 may control and/or monitor the operations of the machine 105 based on information from the operator controls and/or from the sensor system 120.

The rear attachment 150 may include a ripper assembly, a winch assembly, and/or a drawbar assembly, among other examples. The front attachment 160 may include a blade assembly, among other examples.

The ground engaging members 170 may be configured to propel the machine 105 across a ground surface. The ground engaging members 170 may include wheels, tracks, and/or rollers, among other examples, for propelling the machine 105. In some instances, the ground engaging members 170 may be associated with an undercarriage that includes tracks (as shown in FIG. 1).

The implement control system 180 can control an implement of the machine 105 (e.g., the rear attachment 150 and/or the front attachment 160). The implement control system 180 may include one or more pumps, valves, and/or hoses (as described in more detail below in connection with FIG. 2).

As indicated above, FIG. 1 is provided as an example. Other examples may differ from what was described in connection with FIG. 1.

Figure 2:
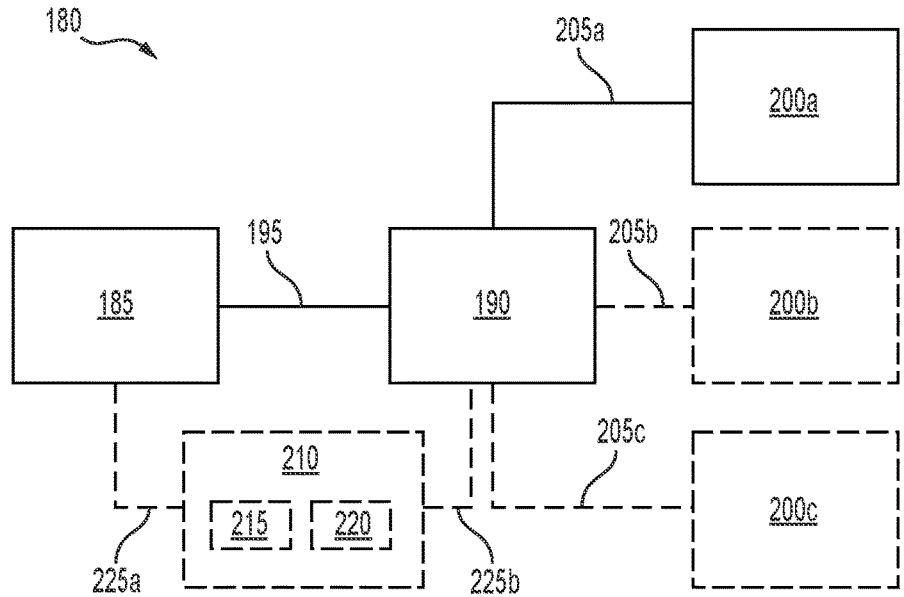
FIG. 2 is a diagram of an example implement control system described herein.

FIG. 2 is a diagram of an example implement control system 180 described herein. In some examples, the implement control system may include less equipment, additional equipment, or alternative equipment compared to the example system depicted in FIG. 2. As shown in FIG. 2, the example implement control system 180 includes a pump 185, a valve 190, a hose 195 connected between the pump 185 and the valve 190, and one or more implements 200*a*-200*c* connected to the valve 190 via respective hoses 205*a*-205*c*.

The pump 185 may include a hydraulic pump for supplying fluid (e.g., hydraulic fluid) at pressure, from a fluid source, to the one or more implements 200*a*-200*c*, via the valve 190.

The valve 190 may include a hydraulic control valve (e.g., a directional control valve, a pressure control valve, or a flow control valve, among other examples) for supplying fluid at pressure, from the pump 185, selectively to the one or more implements 200*a*-200*c*.

The term "hose" may refer to any flowline that may be associated with a machine and/or system, such as, for example, any type of fluid conduit, pipe, and/or other types of flowlines. The hose 195 (which may be similar to the hoses 205*a*-205*c*) may include a high-pressure-rated hydraulic hose (e.g., a steel fiber-reinforced rubber hose), among other examples.

The one or more implements 200*a*-200*c* may include a ripper assembly, a winch assembly, a drawbar assembly, and/or a blade assembly (e.g., corresponding to the rear attachment 150 and/or the front attachment 160 of the machine 105 shown in FIG. 1). The one or more implements 200*a*-200*c* may include one or more actuators (e.g., hydraulic cylinders) configured to actuate the respective implements 200*a*-200*c*.

Each one of the hoses 205*a*-205*c* depicted schematically in FIG. 2 may define a plurality of separate directional flow paths associated with the one or more actuators of the respective implements 200*a*-200*c*. For example, the hose 205*a* (which may be similar to the hoses 205*b*-205*c*) may represent a pair of hoses connected between the valve 190 and the respective implement 200*a*, and may be configured to actuate the respective actuator of implement 200*a* in first and second opposite directions.

The implement control system 180 may include a controller 210. The controller 210 may be in data communication with the pump 185 and/or the valve 190. The controller 210 may include memory 215 and one or more processors 220 configured to implement instructions for controlling the pump 185 and/or the valve 190, via respective communication links 225 (225*a*-225*b*). In some examples, the pump 185 and/or the valve 190 may be controlled manually.

As indicated above, FIG. 2 is provided as an example. Other examples may differ from what was described in connection with FIG. 2.

Figure 3:
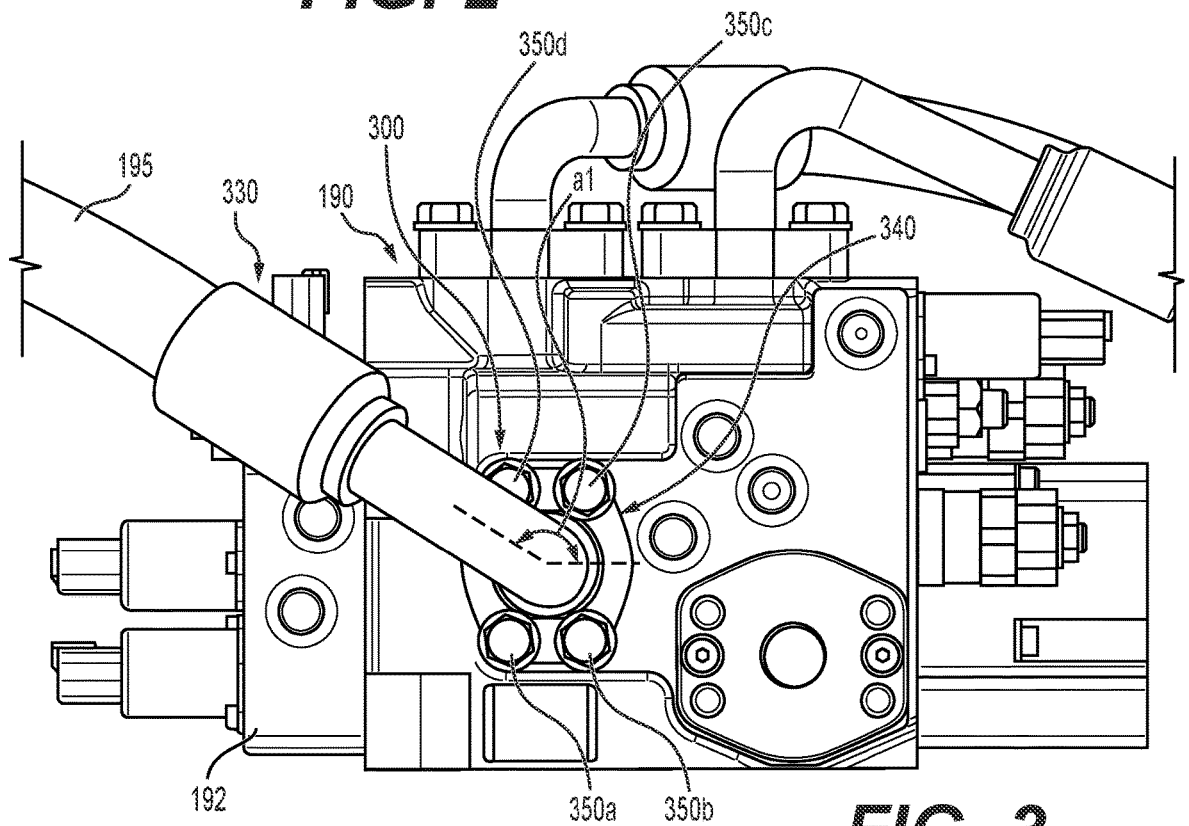
FIG. 3 is a diagram of an example hydraulic coupling connection described herein.

FIG. 3 is a diagram of an example hydraulic coupling connection 300 described herein. For example, FIG. 3 depicts a side view of an example valve 190. As shown in FIG. 3, the example hydraulic coupling connection 300 is defined between, and configured to connect, the hose 195 and the valve 190. The hydraulic coupling connection 300 is configured to secure the hose 195 at a certain angle with respect to the valve 190 and/or with respect to other parts associated with the machine 105 (as described in more detail below).

As shown in FIG. 3, the example hydraulic coupling connection 300 includes a coupling 330, a split flange 340, and a plurality of fasteners 350 (350a-350d). The coupling 330 is disposed at an end of the hose 195. The split flange 340 is secured to a body 192 of the valve 190, via the plurality of fasteners 350a-350d disposed through corresponding openings in the split flange 340.

As shown in FIG. 3, the hydraulic coupling connection 300 is secured at a first angle a1. The coupling 330 and the split flange 340 may also secure the hydraulic coupling connection 300 at a plurality of incremental angles in relation to the first angle (as described in more detail below).

As indicated above, FIG. 3 is provided as an example. Other examples may differ from what was described in connection with FIG. 3.

Figure 4A:
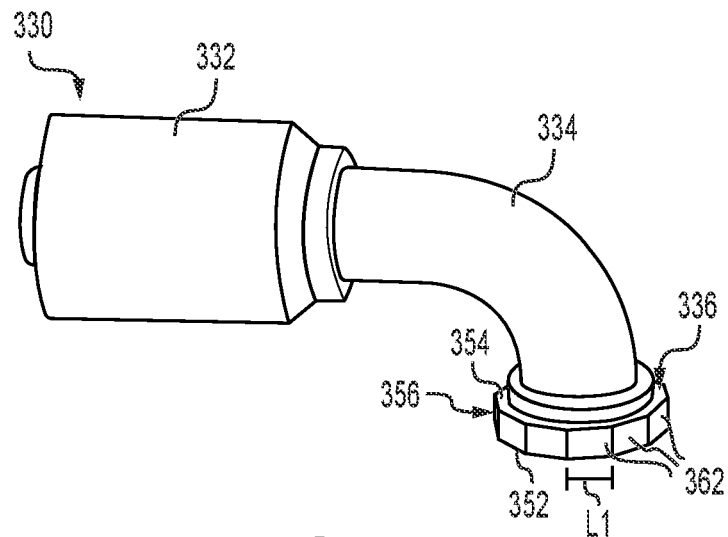
FIG. 4A is a diagram of a perspective view of an example coupling described herein.

FIG. 4A is a diagram of a perspective view of the example coupling 330 described herein. As shown in FIG. 4A, the coupling 330 includes a shell 332, a neck 334, and a flange 336. The shell 332 is defined at a proximal end of the coupling 330. The shell 332 may be crimped to the end of the hose 195. The shell 332 may be brazed or welded to the neck 334. The neck 334 is connected between the flange 336 and the shell 332. The neck 334 may be angled to facilitate connection of the coupling 330 to the body 192 of the valve 190. The flange 336 is defined at a distal end of the coupling 330, opposite the hose 195.

The flange 336 includes a lower surface 352, an upper surface 354, and an outer diameter surface 356 connecting the lower surface 352 and the upper surface 354. The lower surface 352 is configured to engage the body 192 of the valve 190. The lower surface 352 may include an annular groove 358 with a seal 360 disposed therein (shown in FIG. 4D). The seal 360 is configured to sealingly engage the body 192 of the valve 190.

As shown in FIG. 4A, a first plurality of straight sides 362 (e.g., 12 total sides, of which only six are visible in FIG. 4A) is defined in the outer diameter surface 356. The first plurality of straight sides 362 may extend around an entire circumference of the outer diameter surface 356. Each of the straight sides 362 may have substantially equal length L1. In some examples, the number of straight sides 362 may be within a range from only a single straight side to 18 total sides or more.

As indicated above, FIG. 4A is provided as an example. Other examples may differ from what was described in connection with FIG. 4A.

Figure 4B:
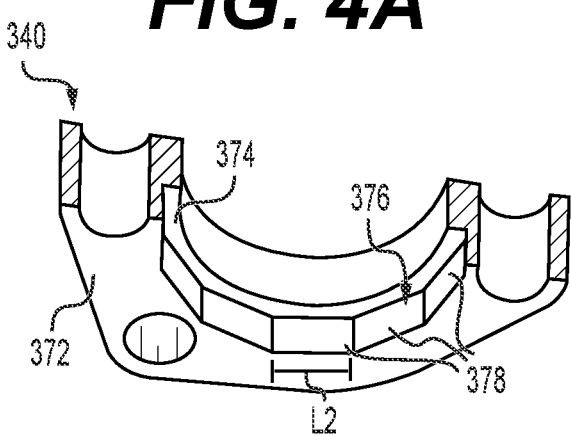
FIG. 4B is a diagram of a perspective view of an example split flange described herein.
Figure 4C:
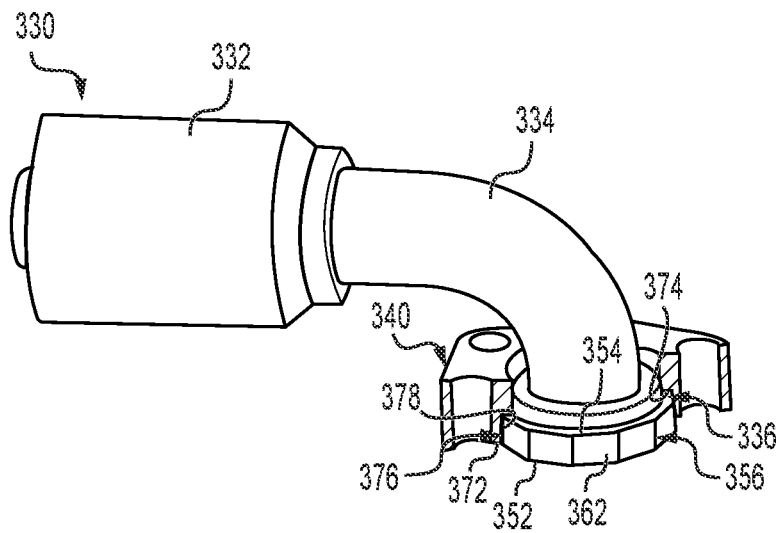
FIG. 4C is a diagram of a perspective view of an example coupling and split flange described herein.
Figure 4D:
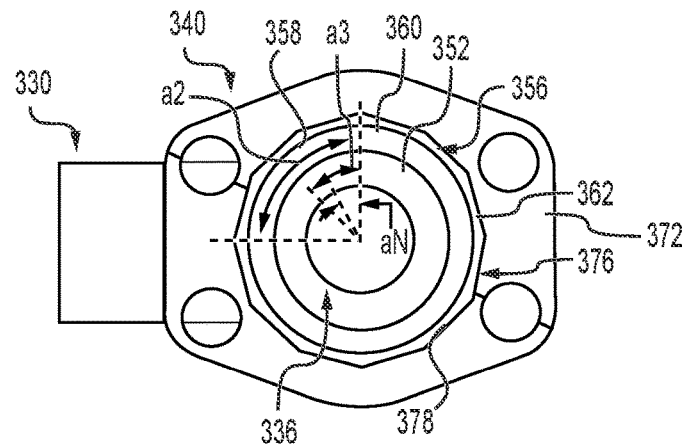
FIG. 4D is a diagram of a bottom view of an example coupling and split flange described herein.

FIG. 4B is a diagram of a perspective view of the example split flange 340 described herein. FIG. 4C is a diagram of a perspective view of the example coupling 330 and split flange 340 described herein. In some examples, the split flange 340 includes two separate pieces (of which one piece is omitted from FIG. 4B and FIG. 4C for clarity) that together define a wide end and a narrow end (as shown in FIG. 4D). FIG. 4D is a diagram of a bottom view of the example coupling 330 and split flange 340 described herein.

As shown in FIG. 4B, the split flange 340 includes a first lower surface 372, a second lower surface 374, and an inner diameter surface 376 connecting the first lower surface 372 and the second lower surface 374.

As shown in FIG. 4C, the first lower surface 372 is configured to engage the body 192 of the valve 190. The first lower surface 372 may be coplanar with the lower surface 352 of the flange 336. The second lower surface 374 is configured to engage the upper surface 354 of the flange 336 to facilitate pressing the lower surface 352 thereof and the seal 360 into contact with the body 192 of the valve 190, via compression force exerted by the one or more fasteners 350, to maintain sealing contact therebetween.

A second plurality of straight sides 378 (e.g., 12 total sides, of which only six are visible in FIG. 4B) is defined in the inner diameter surface 376. The second plurality of straight sides 378 may extend around an entire circumference of the inner diameter surface 376 (as shown in FIG. 4D). In some examples, each of the straight sides 378 may have substantially equal length L2 (e.g., L2 being substantially equal to the length L1 of each of the straight sides 362 of the flange 336). In some examples, the number of straight sides 378 may be within a range from only a single straight side to 18 total sides or more.

As shown in FIG. 4C and FIG. 4D, engagement between the first plurality of straight sides 362 of the outer diameter surface 356 and the second plurality of straight sides 378 of the inner diameter surface 376 is configured to secure the connection at a certain angle (e.g., angle a2 or a3). In addition, the engagement may be configured to secure the hydraulic coupling connection 300 at a plurality of incremental angles aN, about the entire circumference of the outer diameter surface 356. In some examples, the plurality of incremental angles aN include angles within a range of about every 20 degrees to about every 45 degrees about the circumference (e.g., about every 30 degrees).

As indicated above, FIG. 4B, FIG. 4C, and FIG. 4D are provided as an example. Other examples may differ from what was described in connection with FIGS. 4B-4D.

Figure 5:
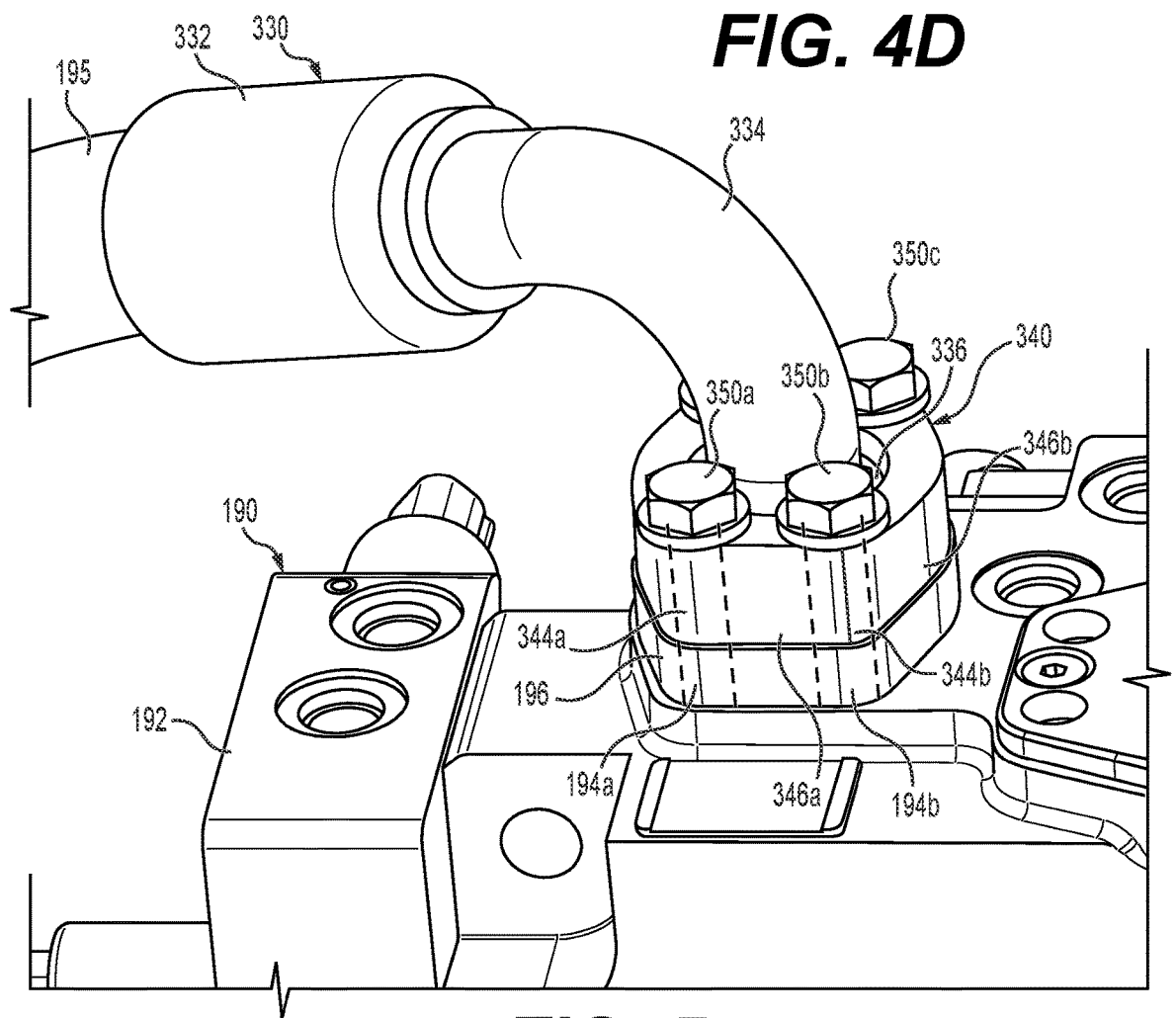
FIG. 5 is a diagram of a perspective view of an example hydraulic coupling connection described herein.

FIG. 5 is a diagram of a perspective view of the example hydraulic coupling connection 300 described herein. As shown in FIG. 5, the example hydraulic coupling connection 300 includes the coupling 330, the split flange 340, and the plurality of fasteners 350a-350d.

The split flange 340 includes openings 344 (e.g., four total openings, of which openings 344a-344b are illustrated with dashed lines in FIG. 5). The split flange 340 includes two separate pieces 346a-346b that together define a wide end and a narrow end.

The plurality of fasteners 350 (of which fasteners 350a-350c are visible in FIG. 5) are disposed through corresponding openings 344 (of which openings 344a-344b are illustrated in FIG. 5) in the split flange 340. The plurality of fasteners 350a-350d may include corresponding washers. The plurality of fasteners 350a-350d are configured to secure the split flange 340 and the coupling 330 to the body 192 of the valve 190. The plurality of fasteners 350a-350d (e.g., bolts, screws, and/or pins, among other examples) may be threaded to corresponding threaded openings 194 (e.g., four total openings, of which openings 194a-194b are illustrated with dashed lines in FIG. 5) in the body 192 of the valve 190. As shown in FIG. 5, the threaded openings 194 may be defined within a raised portion 196 of the body 192 (e.g., a boss) that is configured to align with the split flange 340.

As indicated above, FIG. 5 is provided as an example. Other examples may differ from what was described in connection with FIG. 5.

INDUSTRIAL APPLICABILITY

Machines, such as track-type tractors, and systems, such as implement control systems, may use flowlines (e.g., a hydraulic hose) to route fluid (e.g., hydraulic fluid) between different parts and/or components (e.g., a pump or valve). The hose may have a coupling at each end to secure the hose to the different components. The coupling may be secured to the respective component using a connector (e.g., a split flange). The split flange may have two separate flange pieces (e.g., identical and/or matching pieces) that combine to define the connector. The split flange may be secured to the respective component using multiple fasteners (e.g., bolts).

Generally, because the work area associated with hose coupling connections is a cramped area with little clearance, installers have to be careful that the hose does not contact other parts (e.g., other hoses or sheet metal) to avoid damage (e.g., breakage) caused by rubbing and/or vibration, which may result in fluid leakage and/or system downtime for making repairs. Generally, because the interfacing surfaces of the coupling and the connector are each rounded in shape, the connection can be set at any angle. The task of connecting the hose at a certain angle (e.g., to avoid contact with other parts) is thus inefficient, physically taxing, and time-consuming.

The hydraulic coupling connection 300 described herein reduces a physical burden and conserves time associated with connecting the hose 195 at a certain angle. For example, interlocking surfaces on the coupling 330 and the split flange 340 may be used to easily secure the angle of the hydraulic coupling connection 300 with respect to the valve 190. For example, the angle of the hydraulic coupling connection 300 may be adjustable to a plurality of incremental angles aN, based on a design of the corresponding outer diameter surface 356 and inner diameter surface 376.

When the hydraulic coupling connection 300 is being made-up, the coupling 330 can be rotated so that the hose 195 is set at the desired angle (e.g., corresponding to any one of the plurality of incremental angles aN) based on the engagement between the first one or more straight sides 362 of the coupling 330 and the second one or more straight sides 378 of the split flange 340. Then, the split flange 340 may be attached over the flange 336, using the one or more fasteners 350, to secure the hydraulic coupling connection 300 at the desired angle.

Additionally, the engagement between the first one or more straight sides 362 of the coupling 330 and the second one or more straight sides 378 of the split flange 340 may limit and/or prevent rotation of the hydraulic coupling connection 300 during operation. Furthermore, it is noted that a stiffness level of the hose 195 may facilitate setting an overall shape of the hose 195 along its length, based solely on the angle of the hydraulic coupling connection 300 at one end.

As a result, the task of connecting the hose 195 at a certain angle may be more efficient, less physically taxing, and/or less time-consuming, among other examples. Additionally, a likelihood of damage to the hose 195 may be reduced.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An earthmoving machine, comprising:
   a frame;
   one or more implements mounted on the frame;
   an engine configured to power the machine;
   ground engaging members configured to propel the machine; and
   an implement control system configured to control the one or more implements, wherein the implement control system includes:
      a pump configured to supply fluid, at pressure, to the one or more implements;
      a valve configured to supply fluid, at pressure, from the pump, selectively to the one or more implements;
      a first hose connected between the pump and the valve, wherein a connection defined between the first hose and the valve includes:
         a coupling disposed at an end of the first hose and defining a flange having:
            a lower surface configured to engage a body of the valve;
            an upper surface; and
            an outer diameter surface connecting the lower surface and the upper surface, the outer diameter surface defining a first one or more straight sides; and
         a split flange engaged with the coupling, the split flange having:
            a first lower surface configured to engage the body of the valve;
            a second lower surface configured to engage the upper surface of the flange; and
            an inner diameter surface connecting the first lower surface and the second lower surface, the inner diameter surface defining a second one or more straight sides, wherein engagement between the first one or more straight sides and the second one or more straight sides is configured to secure the connection at a first angle; and
         a plurality of fasteners disposed through corresponding openings in the split flange, wherein the plurality of fasteners are configured to secure the split flange and the coupling to the body of the valve; and a second hose connected between the valve and a first implement of the one or more implements.

2. The earthmoving machine of claim 1, wherein the flange is defined at a distal end of the coupling, opposite the first hose, the coupling further comprising:
a shell defined at a proximal end of the coupling; and
a neck connected between the flange and the shell.

3. The earthmoving machine of claim 1, wherein the first one or more straight sides defined in the outer diameter surface of the flange includes a first plurality of straight sides extending around an entire circumference of the outer diameter surface.

4. The earthmoving machine of claim 3, wherein the second one or more straight sides defined in the inner diameter surface of the split flange includes only a single straight side corresponding to a length of each one of the first plurality of straight sides of the outer diameter surface.

5. The earthmoving machine of claim 1, wherein the second one or more straight sides defined in the inner diameter surface of the split flange includes a second plurality of straight sides extending around an entire circumference of the inner diameter surface.

6. The earthmoving machine of claim 1, wherein the lower surface of the flange includes an annular groove, and wherein a seal disposed in the annular groove is configured to sealingly engage the body of the valve.

7. The earthmoving machine of claim 1, wherein engagement between the first one or more straight sides and the second one or more straight sides is configured to secure the connection at a plurality of incremental angles, about an entire circumference of the outer diameter surface, in relation to the first angle.

8. The earthmoving machine of claim 7, wherein the plurality of incremental angles include angles about every 30 degrees about the circumference.

9. A hydraulic coupling connection defined between a hose and a valve of a machine, the hydraulic coupling connection comprising:
a coupling disposed at an end of the hose and defining a flange having:
  a lower surface configured to engage a body of the valve;
  an upper surface; and
  an outer diameter surface connecting the lower surface and the upper surface, the outer diameter surface defining a first plurality of straight sides; and
a split flange engaged with the coupling, the split flange having:
  a first lower surface configured to engage the body of the valve;
  a second lower surface configured to engage the upper surface of the flange; and
  an inner diameter surface connecting the first lower surface and the second lower surface, the inner diameter surface defining a second plurality of straight sides, wherein engagement between the first plurality of straight sides and the second plurality of straight sides is configured to secure the connection at a first angle.

10. The hydraulic coupling connection of claim 9, wherein the flange is defined at a distal end of the coupling, opposite the hose, the coupling further comprising:
a shell defined at a proximal end of the coupling; and
a neck connected between the flange and the shell.

11. The hydraulic coupling connection of claim 9, wherein the first plurality of straight sides defined in the outer diameter surface of the flange extends around an entire circumference of the outer diameter surface.

12. The hydraulic coupling connection of claim 9, wherein the second plurality of straight sides defined in the inner diameter surface of the split flange extends around an entire circumference of the inner diameter surface.

13. The hydraulic coupling connection of claim 9, wherein each of the straight sides has substantially equal length.

14. The hydraulic coupling connection of claim 9, wherein the lower surface of the flange includes an annular groove, and wherein a seal disposed in the annular groove is configured to sealingly engage the body of the valve.

15. The hydraulic coupling connection of claim 9, wherein engagement between the first plurality of straight sides and the second plurality of straight sides is configured to secure the connection at a plurality of incremental angles, about an entire circumference of the outer diameter surface, in relation to the first angle.

16. The hydraulic coupling connection of claim 15, wherein the plurality of incremental angles include angles about every 30 degrees about the circumference.

17. An apparatus for a hydraulic coupling connection defined between a hose and a valve of a machine, the hydraulic coupling connection including a split flange configured to be engaged with a coupling disposed at an end of the hose, the apparatus comprising:
an outer diameter surface, of the coupling, defining a first plurality of straight sides; and
an inner diameter surface, of the split flange, defining a second plurality of straight sides corresponding to the first plurality of straight sides, wherein engagement between the first plurality of straight sides and the second plurality of straight sides is configured to secure the connection at a plurality of incremental angles.

18. The apparatus of claim 17,
wherein each of the straight sides has substantially equal length,
wherein the first plurality of straight sides extends around an entire circumference of the outer diameter surface of the coupling,
wherein the second plurality of straight sides extends around an entire circumference of the inner diameter surface of the split flange, and
wherein the plurality of incremental angles extend about the entire circumference of the outer diameter surface of the coupling.

19. The apparatus of claim 18, wherein the plurality of incremental angles include angles within a range of about every 20 degrees to about every 45 degrees about the circumference.

20. The apparatus of claim 18, wherein the plurality of incremental angles include angles about every 30 degrees about the circumference.

* * * * *